United States Patent
Yoshida

[11] Patent Number: 5,870,211
[45] Date of Patent: Feb. 9, 1999

[54] ERROR RATE MEASUREMENT SYSTEM FOR HIGH SPEED OPTICAL PULSE SIGNALS

[75] Inventor: Haruo Yoshida, Saitama, Japan

[73] Assignee: Advantest Corp., Tokyo, Japan

[21] Appl. No.: 661,463

[22] Filed: Jun. 11, 1996

[30] Foreign Application Priority Data

Jun. 8, 1995 [JP] Japan .................................. 7-166874

[51] Int. Cl.⁶ .......................... H04B 10/08; G06F 11/00
[52] U.S. Cl. ............................ 359/110; 359/181; 371/5.1
[58] Field of Search .................................. 359/158, 110, 359/181; 371/5.1, 20.1, 5.2; 375/286

[56] References Cited

U.S. PATENT DOCUMENTS

| | | | |
|---|---|---|---|
| 5,301,197 | 4/1994 | Yamada et al. | 371/5.1 |
| 5,533,055 | 7/1996 | Matzek | 375/286 |
| 5,585,954 | 12/1996 | Taga et al. | 359/158 |
| 5,623,355 | 4/1997 | Olsen | 359/110 |

*Primary Examiner*—Kinfe-Michael Negash
*Attorney, Agent, or Firm*—Muramatsu & Associates

[57] ABSTRACT

An error rate measurement system measures a bit error rate of an optical pulse train having a very high frequency and a short pulse width such as an optical soliton signal. The error rate measurement system includes: an electric pulse generator which generates a high repetition rate and short pulse width electric pulse signal; an optical intensity modulator which receives an optical pulse signal transmitted through a transmission path in a communication network and the electric pulse signal from the electric pulse generator wherein the optical intensity modulator detects a non-coincidence signal; a delay circuit for delaying the electric pulse signal such that the electric pulse signal synchronizes with the optical pulse signal from the transmission path at the optical intensity modulator; an opto-electric converter for converting the non-coincidence signal from the optical intensity modulator to an electric signal; and a signal processor which receives the electric signal from the opto-electric converter to determine a bit error rate of the optical pulse signal from the transmission path based on the electric signal.

7 Claims, 3 Drawing Sheets

(A)

→ Terminal Resister (B)

ERROR RATE MEASUREMENT SYSTEM FOR HIGH SPEED OPTICAL PULSE SIGNALS

FIELD OF THE INVENTION

This invention relates to an error rate measurement system which measures an error rate of high speed optical pulse signals, and more particularly, to a bit error rate measurement system which directly measures a bit error rate of an optical soliton pulse train.

BACKGROUND OF THE INVENTION

In a digital communication network, measurements of the accuracy of transmitted data are expressed in terms of several parameters. One of which is a bit error rate, i.e., the fraction of the received bits that are in error. This invention is directed to such an error rate measurement system to measure the bit error rate of an optical pulse signal train in an optical communication network.

Because of the needs of high speed and high density data transmission in the optical communication network, transmissions using optical soliton waves have been attracted attention in the communication industry. This is because a soliton signal in an optical fiber is an extremely good carrier of optical information because of its short duration and high stability which are the very characteristics suitable for optical time division multiplexing. The optical soliton system may realize soliton transmission for a distance of about 10,000 km without significant loss.

Therefore, there is a need of an error rate measurement apparatus for detecting errors in a high speed optical pulse train. However, the conventional error rate measurement instruments are relatively slow in the error detecting speed which is not sufficient for the soliton system whose frequency is typically 10–20 GHz. For example, a protocol analyzer in the ISDN (Integrated Service Digital Networks), which is one of the error rate measurement instruments, covers a measurement frequency up to 1 GHz ($10^9$ bit/sec). For data pulses having a frequency higher than this level, an eye diagram method is used to detect errors therein.

In the eye diagram method, the data pulse is evaluated by observing an eye pattern displayed on a screen of a sampling oscilloscope and the like. In this arrangement, a data pulse train which has been experienced noises and distortions in a transmission path is sampled by a clock signal which is synchronized with the data pulse train having a lower frequency than that of the data pulse train. The sampled signal is displayed on the oscilloscope as an eye pattern.

The opening of the eye, i.e., the voltage difference between the upper voltage and the lower voltage, represents a signal-noise ratio. The greater the opening, the higher it means the signal-noise ratio. When the waveform of the data pulse is degraded, the opening of the eye pattern becomes small. When there is a phase jitter in the data pulse train, the width of the eye pattern becomes small. In this manner, even if the incoming pulse train has a high repetition rate, the errors are detected by the sampling pulse in the eye diagram method so long as the pulse train is continuous and repetitive.

As noted above, the optical soliton caused by a nonlinear action in an optical fiber could be used as an ideal method for a long distance and high density optical communication network. However, to realize such an optical communication network, various parameters must be evaluated including a bit error rate of the optical pulse. This is because there are several factors that cause deterioration in the quality of the optical pulse when transmitted through the optical fiber.

For example, when traveling the optical fiber, the optical pulse train may be phase modulated by the effect of the nonlinear refractive index of the optical fiber. Such a phase modulation interacts with the group velocity dispersion in the optical fiber, which causes the waveform deterioration in the pulse train. Optical amplifiers inserted during the path of the optical fiber may also adversely affect the transmission quality of the pulse train by their polarization dispersion.

The other cause of adversely affecting the waveform quality of the optical pulse train is a mixing of the optical signal light and optical noises in the optical fiber, i.e., a three wave mixing or a four wave mixing, which results in an abrupt increase of noise and a deterioration in the signal waveform. The three wave mixing or four wave mixing is a nonlinear process in which a third or a fourth output signal will be produced when two or three input signals are mixed in a nonlinear optical medium.

Further sources which adversely affect the quality of the optical pulse train are impurities of the materials used in an optical amplifier or an optical fiber, environmental changes such as pressure and temperature surrounding the optical fibers and other optical materials, which cause the polarization dispersion in the optical fiber.

In the conventional technology, it is not possible to measure the transmission quality of the optical pulse train, because the response characteristics of electrical circuits which receive electrical signals converted by a wide band optical detector are insufficient to fully respond to the repetition rate of the pulse train. An optical soliton pulse train is an ultra high repetition rate pulse signal, 10–20 GHz for example, and a pulse width of each optical pulse is less than several picosecond ($10^{-12}$ second). Therefore, as noted above, the transmission quality is evaluated by the eye diagram method by sampling the input signal with sampling pulses of a lower repetition rate than the input signal and in synchronism with the input signal.

However, the eye diagram method is only effective for an input signal which is continuous with a constant repetition rate. It is not effective to evaluate the input signal transmitted through a long distance optical path in which pulses in the input signal may be lost or greatly deformed by the polarization dispersion due to the various causes as noted above. Thus, there is a need of a new type of bit error rate measurement system to directly measure a bit error rate of an optical soliton pulse train.

SUMMARY OF THE INVENTION

Therefore, it is an object of the present invention to provide an error rate measurement system which is capable of directly measuring a bit error rate of an optical soliton pulse train in the optical communication network.

It is another object of the present invention to provide a bit error rate measurement system which is capable of measuring the error rate of the optical soliton pulse train used in the optical communication network with high accuracy even when the optical pulse train to be measured is not a repetitive signal.

It is a further object of the present invention to provide a bit error rate measurement system which is capable of directly measuring the error rate of the optical soliton pulse train used in the optical communication network with the use of an electrical soliton pulse which modulates the optical soliton pulse train to detect error signals.

It is a further object of the present invention to provide a bit error rate measurement system which is capable of directly measuring the error rate of the optical soliton pulse train used in the optical communication network with the use of an electrical pulse generator which generates electrical soliton pulses having a repetition rate and pulse width comparable to the optical soliton pulse train.

In the present invention, an optical soliton pulse train from an optical communication network is modulated by an electric pulse train in an optical intensity modulator to directly detect an error signal in the optical soliton pulse train. The detected error signal is converted to an electric signal which is evaluated by electric circuits in the following stages. Since the error signal thus detected has a low repetition rate, because the probability of errors in the optical soliton pulse train is usually very low, the electric circuits using ordinary circuit components can accurately measure and evaluate the error signal.

The error rate measurement system of the present invention includes: an electric pulse generator which generates a high repetition rate and short pulse width electric pulse signal in synchronism with a modulation signal which modulates a light beam in the optical communication network to form an optical pulse signal to be provided to the optical transmission path; an optical intensity modulator which receives an optical pulse signal transmitted through the transmission path and the electric pulse signal from the electric pulse generator wherein the optical intensity modulator detects a non-coincidence signal by canceling optical pulses in the optical pulse signal which coincide with electric pulses in the electric pulse signal; a delay circuit for delaying the electric pulse signal such that the electric pulse signal synchronizes with the optical pulse signal from the transmission path at the optical intensity modulator; an opto-electric converter for converting the non-coincidence signal from the optical intensity modulator to an electric signal; and a signal processor which receives the electric signal from the opto-electric converter to determine a bit error rate of the optical pulse signal from the transmission path based on the electric signal.

According to the present invention, the error rate measurement system is capable of directly measuring a bit error rate of an optical soliton pulse train in the optical communication network with high accuracy even when the optical soliton pulse train is not a repetitive signal.

Further, according to the present invention, the bit error rate measurement system directly measures the error rate of the optical soliton pulse train used in the optical communication network with the use of the electrical soliton pulse which modulates the optical soliton pulse train to detect error signals. The detected error signals are processed by the electric circuit formed of relatively low speed circuit components since the frequency of the error signal is significantly low.

BRIEF DESCRIPTION OF THE DRAWINGS

FIG. 3A is a plan view of the optical waveguide intensity modulator while FIG. 3B is a cross sectional view of the optical waveguide intensity modulator.

DETAILED DESCRIPTION OF THE PREFERRED EMBODIMENT

Figure 1:
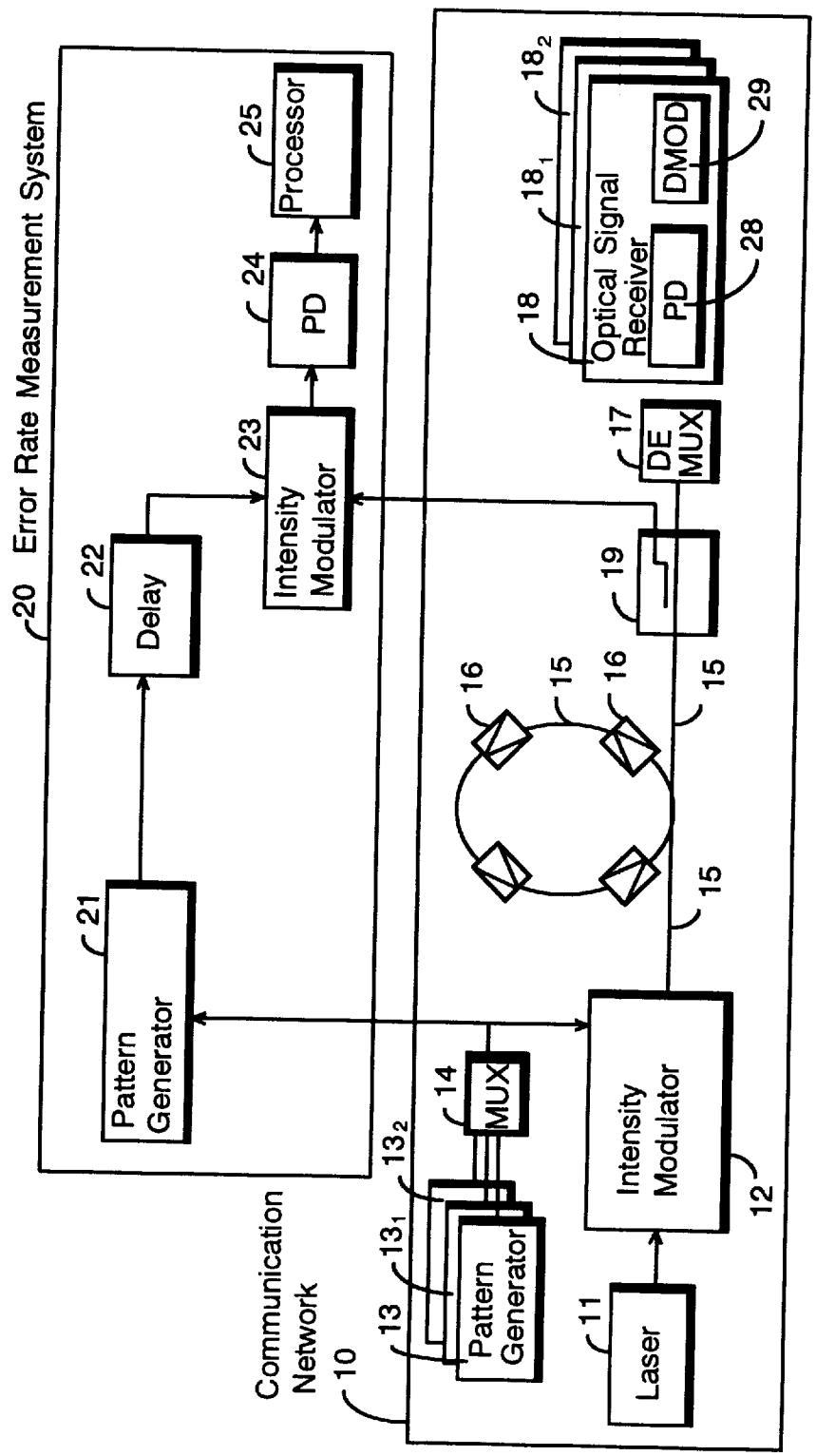
FIG. 1 is a schematic diagram showing a structure of an embodiment of an error rate measurement system for measuring a bit error rate of an optical soliton pulse train in an optical communication network in accordance with the present invention.

FIG. 1 shows an embodiment of the error rate measurement system for an optical soliton pulse train according to the present invention. In FIG. 1, a reference numeral 10 designates an optical communication network and a reference numeral 20 designates an error rate measurement system of the present invention.

The example of communication network 10 includes a laser oscillator 11 which generates a light beam. The light beam is provided to an intensity modulator 12 whereby it is intensity modulated by modulation signals from a multiplexer 14 to form an optical pulse train. The modulation signals are generated by a plurality of pulse pattern generators $13_0$, $13_1$ and $13_2$ which are multiplied by the multiplexer 14 to increase the overall repetition rate. Namely, the pulse pattern generators $13_0$–$13_2$ and the multiplexer 14 constitute a time division multiplexer for generating the modulation signal.

For the purpose of this invention, the intensity modulator 12 is an ultra high repetition rate pulse generator to generate an optical soliton pulse at several ten gigabit per second and a pulse width of each pulse is several picoseconds. An optical intensity modulator of a lower frequency and ordinary optical signal other than the optical soliton is also applicable to the network. Further, a laser oscillator 11 and an intensity modulator may be integral like a semiconductor laser oscillator.

The intensity modulated optical pulse train such as an optical soliton pulse train propagates through a transmission path 15 which is typically an optical fiber. The transmission path 15 may be as long as 10,000 km or more and a plurality of optical amplifiers 16 are inserted in the transmission path 15 to compensate the transmission loss in the path.

The optical pulse train transmitted through the optical fiber 15 is received by an optical receiver having an opto-electric converter (photo detector) 28 and a demodulator 29. In the example of FIG. 1, a plurality of optical signal receivers $18_0$, $18_1$ and $18_2$ are provided to receive the optical pulse through a demultiplexer 17. Namely, the pulse pattern generators $18_0$–$18_2$ and the demultiplexer 17 constitute a time division multiplexer for demodulation signals. The optical pulse from the transmission path 15 is also coupled to the error rate measurement system 20 of the present invention via a directional coupler (power divider) 19. The directional coupler 19 can be replaced with an optical switch or other devices which can take out the optical pulse from the communication network 10.

The foregoing is a general description of the optical communication network for which the error rate measurement system of the present invention is to be used. The error rate measurement system 20 of the present invention is described in detail in the following with reference to the drawings. The error rate measurement system 20 includes an electric pulse generator 21, a delay circuit 22, an optical waveguide intensity modulator 23, an opto-electric converter such as a photo detector 24 and a signal processor 25.

The modulation signal applied to the intensity modulator 12 is supplied to the electric pulse generator 21 from, for example, the pulse pattern generators 13 or the multiplexer 14 in the communication network 10. The optical soliton pulse signal from the optical communication network 10 is divided by the directional coupler 19 to the optical waveguide intensity modulator 23.

In the arrangement of the present invention, the optical soliton pulse train from the optical communication network 10 is modulated by an electric pulse train in the optical waveguide intensity modulator 23 to directly detect an error signal in the optical soliton pulse train. The detected error signal is converted to an electric signal by the photo detector 24 and is evaluated by electric circuits such as the signal processor 25. Since the error signal thus detected has a low repetition rate, because the probability of error in the optical soliton pulse train is usually very low, the electric circuits such as the signal processor 25 of relatively low speed can accurately measure and evaluate the error signal.

In the error rate measurement system 20 of FIG. 1, based on the modulation signal from the optical communication network 10, the electric pattern generator 21 generates an electric soliton pulse signal. The electric soliton pulse signal corresponds, in frequency, to the optical soliton pulse signal generated by the intensity modulator 12 in the network 10. The electric soliton pulse signal functions as a reference signal to detect the error signal in the optical intensity modulator 23. An example of circuit structure of the electric pulse generator 21 will be described later with reference to FIG. 2. An example of circuit structure of the optical waveguide intensity modulator 23 will be described later with reference to FIG. 3.

The electric soliton pulse is supplied to the optical intensity modulator 23 through the delay circuit 22. The delay time of the delay circuit 22 will be adjusted such that the electric soliton pulse synchronizes with the optical soliton pulse signal from the directional coupler 19 at the intensity modulator 23. In the optical waveguide intensity modulator 23, the pulse signal from the optical communication network 10 is intensity modulated by the electric soliton pulse signal such that an optical pulse is canceled when both the optical pulse and the electric pulse coincide with each other. In contrast, when the optical pulse and the electric pulse do not coincide, i.e., there is a non-coincidence, the corresponding optical pulse passes through the optical intensity modulator 23.

The optical pulses thus derived from the intensity modulator 23 because of the non-coincidence is received by the photo detector 24 and is converted to an electric signal. Because of the probability of the non-coincidence between the optical pulse train from the communication network 10 and the electric pulse generated by the measurement system 20 is usually very low, such as $10^{-9}$, the output optical signal from the intensity modulator 23 is sufficiently low in frequency for a signal processing in the signal processor 25. The signal processor determines a bit error rate of the optical pulse train in the optical communication network 10.

Figure 2:
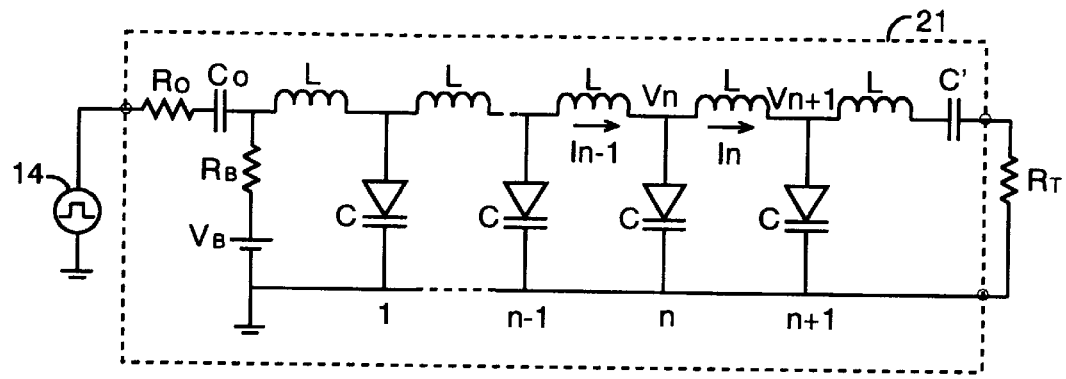
FIG. 2 is a circuit diagram showing an example of electric pulse generator to be used in the embodiment of the present invention shown in FIG. 1.

FIG. 2 shows a circuit example of the electric pulse generator 21 of the present invention. The modulation signal from the multiplexer 14 in the communication network 10 is received by an input resistor Ro and a DC-cut capacitor Co. Basically, the electric pulse generator 21 is formed of a ladder circuit of serial inductors L and parallel capacitors C of Schottky barrier diodes. In FIG. 2, there are n+1 stages of such inductor L and capacitor C. The Schottky barrier diodes are biased by a bias voltage Vb through a bias resistor Rb.

Among the voltage Vn across the n-th capacitor C, the voltage Vn+1 across the (n+1)-th capacitor C, and the current In flowing in the (n+1)-th inductor L, there is a following relationship:

$$L\,(dIn/dt) = Vn - Vn+1 \qquad (1)$$

Among the current flowing in the (n−1)-th inductor L, the current In flowing through the n-th capacitor C, and the charge the electric charge Qn charged in the n-th capacitor C, there is a following relationship:

$$dQn/dt = In-1 - In \qquad (2)$$

By substituting the equation (1) for the equation (2) and further differentiating the equation (2) and multiplying L to the equation (2):

$$L(d^2Qn/dt^2) = Vn-1 + Vn+1 - 2Vn \qquad (3)$$

Between the electric charge Qn charged in the n-th capacitor C and the voltage across the n-th capacitor C, there is a relationship:

$$Qn = CVn \qquad (4)$$

By inserting the equation (4), the equation (3) is expressed as follows:

$$L(d^2Vn/dt^2) = [Vn-1 + Vn+1 - 2Vn]/C \qquad (5)$$

When the capacitor C is a nonlinear capacitance, like a diode junction capacitance being changed by a voltage, the nonlinearlity of the capacitance is expressed as follows:

$$C(Vn) = Co(Vo/Vn)\,\log(1+Vn/Vo) \qquad (6)$$

Applying this relationship to the equation (5), $$L(d^2ln(1+Vn/Vo)dt^2) = (1/Q(Vo))\,[Vn-1+Vn+1-2Vn] \qquad (7)$$

which is an electric soliton signal.

In a simulated circuit using 40 stages of Schottky diodes, an electric soliton pulse has a frequency of 20 GHz and a pulse width of 3 picosecond.

Figure 3:
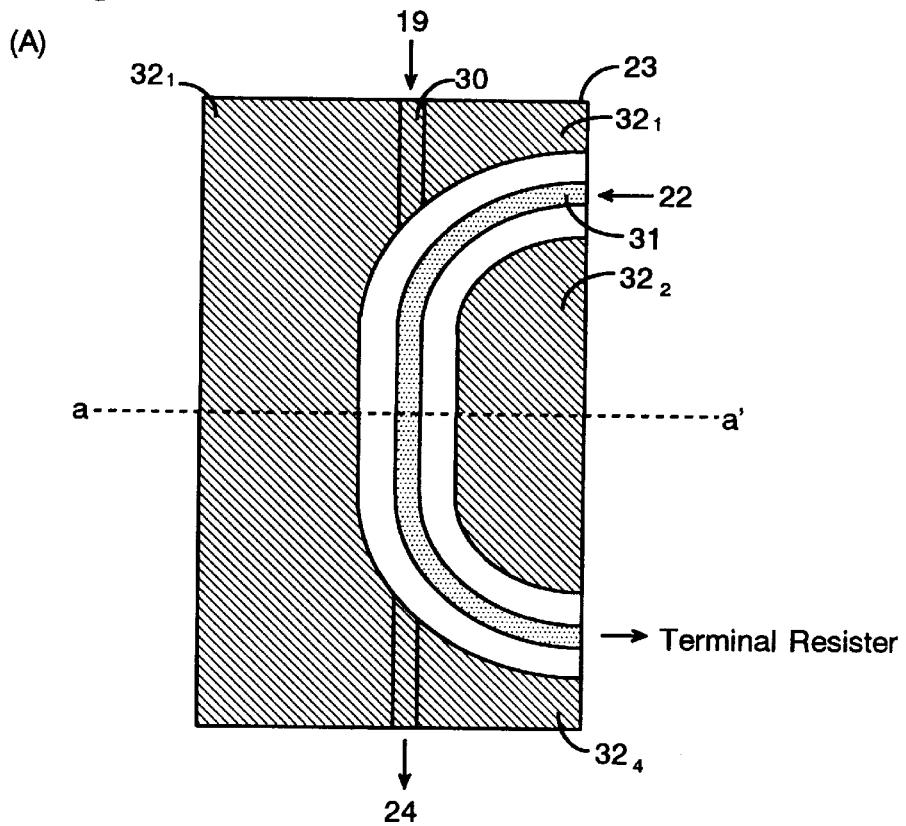
FIG. 3 is a schematic diagram showing a structure of an optical waveguide intensity modulator to be used in the embodiment of the present invention.

FIG. 3 is a schematic diagram showing a structure of the optical waveguide intensity modulator 23 to be used in the embodiment of FIG. 1. FIG. 3A is a plan view of the optical waveguide intensity modulator while FIG. 3B is a cross sectional view of the optical waveguide intensity modulator. The optical waveguide intensity modulator 23 receives the electric soliton pulse from the pulse generator 21 and the optical soliton pulse from the optical communication network 10.

In FIG. 3, an optical waveguide 30 is embedded in a substrate 33 and is provided with the optical soliton pulse train from the optical communication network 10 through the directional coupler 19. Above the optical waveguide 30 and over the substrate 33, a coplanar type electric signal path 31 is formed for transmission of the electric soliton pulse from the electric pulse generator 21 through the delay circuit 23 as noted above. The other end of the signal path 31 is connected to a terminal impedance, such as a resistor (not shown) for an impedance matching. Both sides of the signal path 31 are provided with ground planes $32_1$ and $32_2$ for establishing an appropriate characteristic impedance for transmission of the electric soliton pulse signal.

When the electric soliton pulse propagates through the signal path 31, the resulting electric field modulates the intensity of the optical pulse propagating through the optical waveguide 30. The optical soliton pulse which coincides with the electric soliton pulse is intensity modulated such that the power of the optical pulse is greatly reduced or canceled. The optical soliton pulse which is asynchronous with the electric soliton pulse remains unchanged. The asynchronous optical soliton pulses pass through the optical waveguide 30 and are detected by the photo detector 24.

Figure 4:
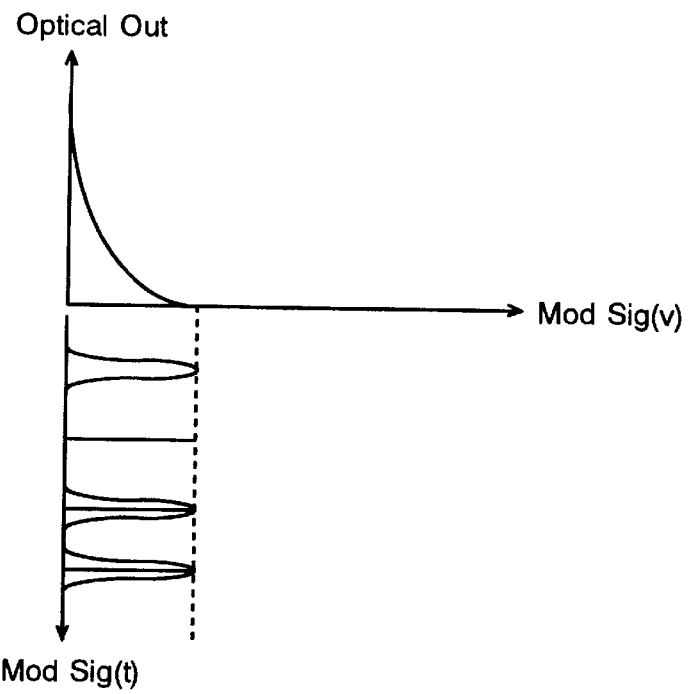
FIGS. 4A–4E is a schematic diagram showing waveforms and timings for explaining the operation of the optical waveguide intensity modulator of FIG. 3.
Figure 4:
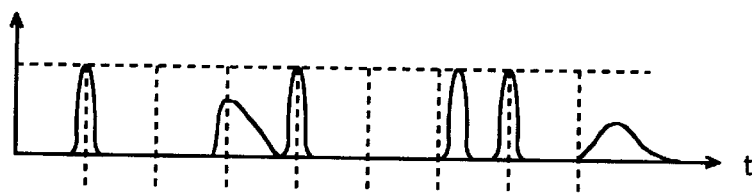
Figure 4:
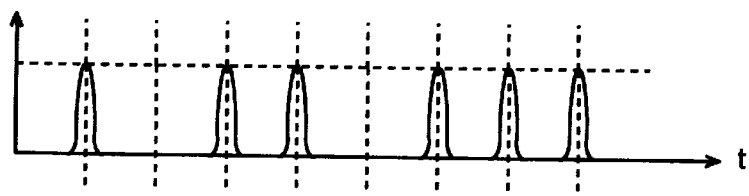
Figure 4:
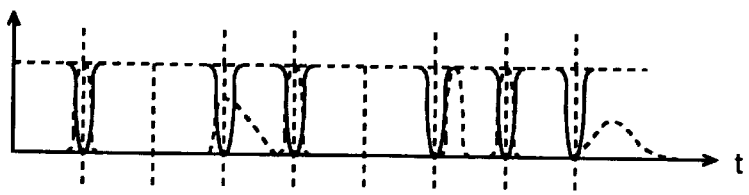
Figure 4:
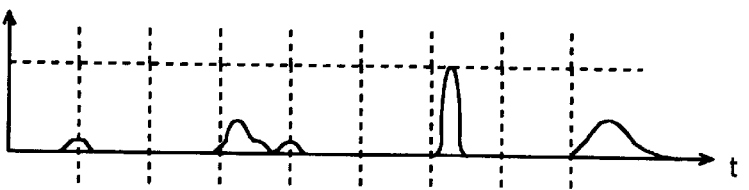

FIG. 4 is a schematic diagram showing waveforms and timings for explaining the operation of the optical waveguide intensity modulator of FIG. 3. FIG. 4A shows a relationship between the optical output (optical soliton pulse) from the waveguide 30 and the modulation voltage (electric soliton pulse) in the signal path 31 in the optical waveguide intensity modulator 23.

In FIG. 4A, the vertical axis represents the optical output while the horizontal axis represents the modulation voltage. When the modulation voltage (electric soliton pulse) exceeds a certain threshold level, the optical output or transmissivity of the optical soliton pulse becomes zero. The electric soliton pulse, i.e., the modulation voltage shown in the lower part of FIG. 4A is applied to the intensity modulator 23. The modulation voltage has a peak voltage which is higher than the threshold level.

FIGS. 4B–4E are timing charts showing waveforms at various timings to explain the operation of the optical waveguide intensity modulator 23. FIG. 4B shows the optical pulse train that is to be measured and transmitted through the long distance optical fiber in the optical communication network 10. The waveforms of the optical pulse train are deteriorated because of the long distance transmission. FIG. 4C shows a reference electric pulse train from the electric pulse generator 21.

In the optical waveguide intensity modulator 23, the optical pulse train is modulated by the electric pulse train by the timing as shown in FIG. 4D. Namely, the optical pulse coincides with the electric pulse in timing is canceled. The resulted output of the intensity modulator 23 is shown in FIG. 4E which is converted to an electric signal by the photo detector 24. The electric signal is transferred to the signal processor 25 wherein the error rate of the optical pulse train is determined. Preferably, only the electric signal having a higher voltage level than a predetermined threshold level is provided to the signal processor 25 to remove noises in the electric signal.

As in the foregoing, the error rate measurement system needs a modulation signal from the transmitting station and optical pulse train from the receiving station. There is not a problem in this requirement for an experiment in a laboratory or a factory since the lengthy optical fiber may be looped and bound to form a long distance transmission path. However, for the actual communication system, it is not practical to receive both the modulation signal and the optical pulse train transmitted through the optical fiber by the error rate measurement system since the distance of the network is too great such as 10,000 km.

In such a situation, one of the preferable method of testing the error rate using the present invention is to provide pseudo-random signal generators both at the sending station of the communication network and the receiving station of the communication network. A light beam in the sending station is modulated by the pseudo-random signal generator to generate an optical pulse signal to be supplied to the transmission path. The electric pulse generator 21 in the error rate measurement system is triggered by a random signal generated by another pseudo-random signal generator provided at the receiving station of the communication network.

Both of the pseudo-random signal generators are arranged to generate the same random signals when the initial states of the generators are identical and excited by the identical clock signal. When measuring the error rate in this setting, the operations of the pseudo-random signal generators in the sending station and the receiving station are initiated at the same time by an international standard time which is provided through a radio wave or a satellite transmission. Therefore, the error rate measurement will be performed even if the receiving station is apart from the sending station by a long distance.

According to the error rate measurement system of the present invention, the optical soliton pulse train from an optical communication network is modulated by the electric soliton pulse train in the optical intensity modulator to directly detect an error signal in the optical soliton pulse train. The detected error signal is converted to the electric signal which is evaluated by the signal processor. Since the error signal thus detected has a low repetition rate, because the probability of error in the optical soliton pulse train is usually very low, the electric circuits using ordinary circuit components can accurately measure and evaluate the error signal.

Therefore, the error rate measurement system of the present invention is capable of directly measuring a bit error rate of an optical soliton pulse train in the optical communication network with high accuracy even when the optical soliton pulse train is not repetitive.

Further, according to the present invention, the bit error rate measurement system directly measures the error rate of the optical soliton pulse train used in the optical communication network with the use of the electrical soliton pulse which modulates the optical soliton pulse train to detect error signals. The detected error signals are processed by the electric circuit formed of relatively low speed components since the frequency of the error signal is significantly low.

What is claimed is:

1. An error rate measurement system for a high speed optical pulse signal for analyzing a bit error rate of an optical pulse signal transmitted through a long distance optical transmission path in an optical communication network, comprising:

an electric pulse generator which generates a high repetition rate and short pulse width electric pulse signal in synchronism with a modulation signal which modulates a light beam in said optical communication network to form an optical pulse signal to be provided to said optical transmission path so that said optical pulse signal and said electric pulse signal have the same repetition rate;

an optical intensity modulator which receives an optical pulse signal transmitted through said transmission path and said electric pulse signal from said electric pulse generator, said optical pulse signal being introduced into an optical waveguide in said optical intensity modulator where optical transmissivity of said waveguide being regulated by said electric pulse signal in such a way that said optical intensity modulator detecting a non-coincidence signal by canceling optical pulses in said optical pulse signal which coincide with electric pulses in said electric pulse signal;

a delay circuit for delaying said electric pulse signal such that said electric pulse signal synchronizes with said optical pulse signal from said transmission path at said optical intensity modulator;

an opto-electric converter for converting said non-coincidence signal from said optical intensity modulator to an electric signal; and a signal processor which receives said electric signal from said opto-electric converter to determine a bit error rate of said optical pulse signal from said transmission path based on said electric signal.

2. An error rate measurement system for a high speed optical pulse signal as defined in claim 1, wherein said optical pulse signal is an optical soliton signal generated by a nonlinear action of an optical fiber and said electric pulse signal is an electric soliton signal generated by a nonlinear action of a semiconductor junction capacitor.

3. An error rate measurement system for a high speed optical pulse signal as defined in claim 1, wherein said electric pulse generator includes a plurality of Schottky barrier diodes whereby generating an electric soliton signal excited by a nonlinear action in junction capacitors of said Schottky barrier diodes.

4. An error rate measurement system for a high speed optical pulse signal as defined in claim 1, wherein said electric pulse generator is formed of a ladder circuit each stage of said ladder circuit has a series inductor and a parallel capacitor, said parallel capacitor being a junction capacitor of a Schottky barrier diode in which a capacitance value varies in a nonlinear manner when a bias voltage is provided to said Schottky barrier diode.

5. An error rate measurement system for a high speed optical pulse signal as defined in claim 1, wherein said optical intensity modulator includes an electric line formed on the surface of a substrate right above said optical waveguide, and said optical waveguide is embedded in said substrate of said modulator.

6. An error rate measurement system for a high speed optical pulse signal as defined in claim 5, wherein said electric line is formed on said substrate in a coplanar structure having ground planes on both sides of said electric line on said surface of said substrate.

7. An error rate measurement system for a high speed optical pulse signal for analyzing a bit error rate of an optical pulse signal transmitted through a long distance optical transmission path in an optical communication network, comprising:

an optical pulse signal generator for generating an optical pulse signal to be supplied to said transmission path by modulating a light beam with a first random signal generated by a first random signal generator in a predetermined sequence;

an electric pulse generator which generates a high repetition rate and short pulse width electric pulse signal in synchronism with a second random signal generated by a second pseudo-random generator in a sequence identical to said first random signal;

an optical intensity modulator which receives an optical pulse signal transmitted through said transmission path and said electric pulse signal from said electric pulse generator, said optical pulse signal being introduced into an optical waveguide in said optical intensity modulator where optical transmissivity of said waveguide being regulated by said electric pulse signal in such a way that said optical intensity modulator detecting a non-coincidence signal by canceling optical pulses in said optical pulse signal which coincide with electric pulses in said electric pulse signal;

a delay circuit for delaying said electric pulse signal such that said electric pulse signal synchronizes with said optical pulse signal from said transmission path at said optical intensity modulator;

an opto-electric converter for converting said non-coincidence signal from said optical intensity modulator to an electric signal; and a signal processor which receives said electric signal from said opto-electric converter to determine a bit error rate of said optical pulse signal from said transmission path based on said electric signal;

wherein operations of said first and second random signal generators are initiated at the same time in response to an international standard time.

\* \* \* \* \*